United States Patent Office

3,623,885
Patented Nov. 30, 1971

3,623,885
EXTRUSION OF PROTEINACEOUS MATERIALS
Mokhtar M. Hamdy, Minneapolis, Minn., assignor to Archer Daniels Midland Company, Minneapolis, Minn.
No Drawing. Filed Dec. 13, 1968, Ser. No. 783,731
Int. Cl. A23j 1/14
U.S. Cl. 99—17
6 Claims

ABSTRACT OF THE DISCLOSURE

In the extrusion of meat substitute products from oil seed proteinaceous materials, the extrusion of compositions containing up to about 5% fat is improved by the addition of small amounts of finely divided α-cellulose to the extrusion mix. By this means, the fat can be more economically introduced prior to extrusion rather than in a post extrusion step.

---

The present invention relates to the production of meat-like food products from vegetable, fish, and similar protein sources. More particularly, the present invention relates to the production of protein structures having a texture and appearance very similar to muscle protein found in common meat products such as steaks, fowl, chops, hams, and the like. The present invention further relates to a process for preparing meat-like protein products containing a proportion of oil or fat. In particular, this invention relates to protein meat-like products wherein the fat is incorporated during extrusion and not in a separate step following extrusion.

The preparation of meat-like food products from other more available and more economical protein sources has long been the aim of the food industry. Heretofore, food technologists have relied in many instances on various methods involving the extrusion of protein compositions into fibers in order to produce meat-like products which simulate the fibrous chewing quality of meat. A number of such processes are well known.

This invention relates in particular to an improvement of the process described in Ser. No. 587,939 filed on Aug. 17, 1966, the teachings of which are hereby incorporated by reference, in which proteinaceous materials containing water are plasticized and extruded at elevated temperatures, e.g. above 200°, into a medium of lower pressure causing a porous, expanded protein-containing product having a plexilamellar structure to be formed. In the process described in the above-mentioned application for the extrusion of proteins, it is often desirable to include proportions of fats and oils for purposes of flavor and eating quality. It can be appreciated that it is more economical to incorporate the fat in the mix before extrusion than to apply the fat in a post extrusion step. It has been found, however, that the presence of fats and oils, when present in the extrusion mix in amounts in excess of 0.5 to 1.0%, interferes with the plasticization of the protein and the consequent formation of a plexilamellar extrudate which can be rehydrated .

It is, therefore, an object of the present invention to provide a protein product of meat-like texture, appearance, and consistency.

It is a further object of this invention to produce such meat-like products from inexpensive proteinaceous raw materials. It is a particular object of this invention to produce meat-like products containing a proportion of fat.

The most important object of this invention is to provide a method and composition for achieving these fat levels directly by incorporation of the fat into the extrudate mix.

Still other objects will be apparent from the following discussion.

The meat-like protein product of the present invention is obtained by preparing a mix of a proteinaceous material, an edible fat component, water, and, in addition, a small but effective amount of finely divided α-cellulose. It has now been discovered that the addition of α-cellulose to the protein extrudate mixes containing from 0.5 to 5% of an edible fat component allows the extrusion of such materials into rehydratable plexilamellar extrudates.

This invention is primarily concerned with the preparation of meat-like protein products by the extrusion of moistened, proteinaceous material in the form of a plastic mass at temperatures above 200° F. through an orifice into a medium of lower pressure to result in a porous, protein-containing product of plexilamellar structure and having an open-cell structure in which the majority of cells have cell dimensions of greater than average length and average width, the length of said cells being substantially aligned. More specifically and preferably, the protein mix is extruded with a moisture content of 20 to 60% based on the protein mix at temperatures of 200 to 450° F. with a pressure drop of at least 100 p.s.i. across the extrusion orifice. The method, however, can be adapted to any protein extrusion process where it would be desirable to have a product containing fat and in which the aforementioned problems occur when the fat is incorporated directly into the extrusion mix.

The process and compositions of this invention allow the addition of up to about 5 of an edible fat component directly to an extrudate prepared from solvent extracted proteinaceous materials. The term "fats" as employed herein is intended to include liquid and soluble materials comprising triglycerides of fatty acids which are edible. The method may also be applied to the extrusion of protein materials containing fats or oils which are difficult to extrude because of their oil content. As mentioned above, extrudates containing up to about 5% fat or oil can be satisfactorily extruded in accordance with this invention by the expedient of inclusion of a small, but effective amount of finely divided α-cellulose in the extrusion mix. By the term, "small but effective" it is meant the amount of α-cellulose necessary to provide satisfactory extrusion of extrudates containing up to about 5% fat. The amounts of α-cellulose which have been found to be effective are from about 0.1 to 10% by weight based on solids of the extrudate. Substantially more than about 5% by weight of fat cannot be satisfactorily incorporated by the method of this invention.

The process of the present invention is not limited to any particular type of protein. Any type of edible protein or vegetable, fish, or animal origin can be employed. The term "proteinaceous material" or "protein-containing material" as employed herein is intended to define an edible material having a protein content of at least 30% by weight. The protein can be employed in substantially pure form, in water-soluble form, or, as is preferred, in the form of flakes of flour. Preferred proteinaceous materials are obtained by solvent extraction of oil seeds such as peanuts, cottonseeds, sesame seeds, or soybeans. Solvent extraction of oil seeds to remove oil and other fatty materials is well known in the art, and thus need not specifically be described. The oil seed meals which have protein concentrations of 40–70% are preferred since they can be extruded into the plexilamellar product desired over a broad range of conditions. Finely divided protein flour is less preferred because of its higher lubricity and its lesser tendency to shear and orientate. The protein concentration of the protein material to be extruded should, however, in the preferred process of this invention, be maintained at a level above 30% since otherwise the non-proteinaceous ingredients will interfere in the formation of the continuous protein phase and its orientation in the masticating step.

The invention is further illustrated by the following examples in which all parts are by weight unless otherwise indicated:

EXAMPLE 1

This example illustrates the preparation of an unflavored textured vegetable protein containing fat in accordance with this invention.

The following ingredients were blended in a ribbon blender at 120° F. for about 20 minutes.

| Ingredient: | Parts by wt. |
|---|---|
| Solvent extracted soy flakes | 90 |
| Avicel ($\alpha$-cellulose) | 5 |
| Crisco (hydrogenated shortening) | 5 |
| Water added for extrusion | 45 |

The resulting composition was extruded in a "Prodex" 1¾ inch extruder equipped with a medium compression screw and an extrusion die containing eight 3/16" diameter orifices. The extruder was maintained at a temperature of 350° F. at the extrusion die and the front end of the barrel. The screw was rotated at the rate of 146 r.p.m. The product expanded rapidly on emerging from the die while releasing steam. Substantially dry plexilamellar protein strands were obtained which were cut into 0.5 inch lengths by a rotating knife. The product was canned in water and autoclaved at 15 p.s.i. steam for 60 minutes. The product had a firm fibrous structure and a fair, meat-like texture.

EXAMPLE 2

This example illustrates the preparation of a textured vegetable protein product containing fat and simulating chicken prepared in accordance with this invention.

The following ingredients were blended and extruded as in Example 1.

| Ingredient: | Parts by wt. |
|---|---|
| Soy flake (containing 1% oil) | 84.0 |
| Chicken flavor (contains 8.0% fat) | 10.0 |
| Salt | 3.0 |
| Avicel ($\alpha$-cellulose) | 3.0 |
|  | 100.0 |
| Water added for extrusion | 40.0 |

The product resembled chicken in appearance and taste, and had firm and chewy eating characteristics.

From the foregoing description of specific embodiments of the present invention, numerous modifications and alterations will be apparent to those skilled in the art, and it is intended that such be included within the scope of the present invention.

Although the invention has been described in considerable detail with reference to certain preferred embodiments thereof, it will be understood that variations and modifications can be effected within the spirit and scope of the invention as described above and as defined in the appended claims.

What is claimed is:

1. The process of preparing an expanded food product having an open cell structure in which the majority of cells have a cell dimension of greater than average length and average width, the length of said cells being substantially aligned, by extruding a composition comprising
    (a) a solvent-extracted oil seed material having a protein concentration of at least 30%;
    (b) 1–5 percent by solids weight of fat;
    (c) 0.1–10% by solids weight of finely divided $\alpha$-cellulose; and
    (d) 20–60 percent by weight of water based on the above protein mix; said extrusion being conducted at a temperature of 200 to 450° F. into a medium of lower pressure.

2. The process of claim 1 in which said solvent-extracted material is soybean protein.

3. The process of claim 1 in which said solvent-extracted material has a protein concentration of 40–70%.

4. The process of claim 1 wherein the pressure of said medium of lower pressure is at least 100 p.s.i. lower.

5. An expanded food product comprising a solvent extracted oil seed material having a protein concentration of at least 30%, containing 1 to 5% by solids weight of fat, and .1–10% by solids weight of finely divided $\alpha$-cellulose, said product having an open cell structure in which the majority of cells have cell dimensions of greater than average length than average width, the length of said cells being substantially aligned.

6. The product of claim 5 in which said oil seed proteinaceous material is soybean protein.

References Cited

UNITED STATES PATENTS

| 3,023,104 | 2/1962 | Battista | 99—1 |
| 3,140,953 | 8/1964 | Roberts | 99—128 |

A. LOUIS MONACELL, Primary Examiner

W. A. SIMONS, Assistant Examiner